No. 12,743. REISSUED JAN. 28, 1908.

E. W. COKELY.

WALKING BEAM TRUSS ROD.

APPLICATION FILED DEC. 26, 1907.

Witnesses:

Alex Currie

H. B. Clark

Inventor:

E. W. Cokely by

Medina & Griffin

Attorneys

UNITED STATES PATENT OFFICE.

ELMER W. COKELY, OF COALINGA, CALIFORNIA.

WALKING-BEAM TRUSS-ROD.

No. 12,743. Specification of Reissued Letters Patent. Reissued Jan. 28, 1908.

Original No. 868,646, dated October 22, 1907, Serial No. 366,484. Application for reissue filed December 26, 1907. Serial No. 408,196.

*To all whom it may concern:*

Be it known that I, ELMER W. COKELY, a citizen of the United States, and a resident of Coalinga, in the county of Fresno, in the State of California, have invented a certain new and useful Walking-Beam Truss-Rod, of which the following is a specification in such full and clear terms as will enable those skilled in the art to make and use the same.

This invention relates to walking beams used in the drilling of oil and gas wells.

It is customary in the drilling of deep wells to use a walking beam for "jumping" the drill, and since the drills are very heavy and often get stuck in the hole the strain on the beam is very great, but since it is also customary to use the drilling beam in pumping the well after the oil has been struck it is not desired to make the beam too heavy or costly.

Another feature is that the beam must have a certain amount of resilience to make it do the drilling properly, for if too stiff it is liable to break the drill rope too often.

This invention is intended to strengthen the beam during the time the well is being drilled, and yet allow it to retain some of its resiliency. It is also intended to allow the use of a lighter beam than would be possible were it not trussed, and in this way the cost of the beam for the pumping plant is decreased.

Another object of the invention is to provide means to prevent the ends of the beam from splitting during the time the well is being drilled.

Figure 1:
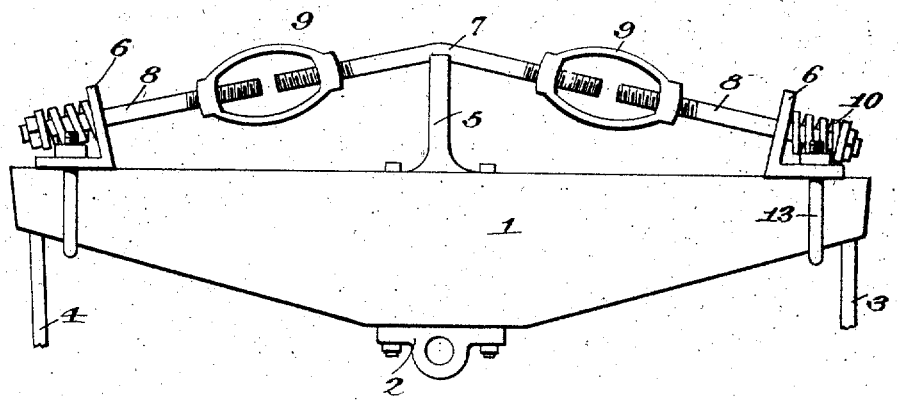
Figure 2:
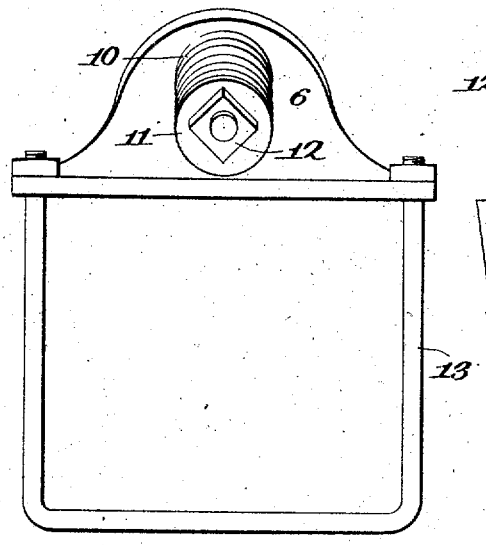
Figure 3:
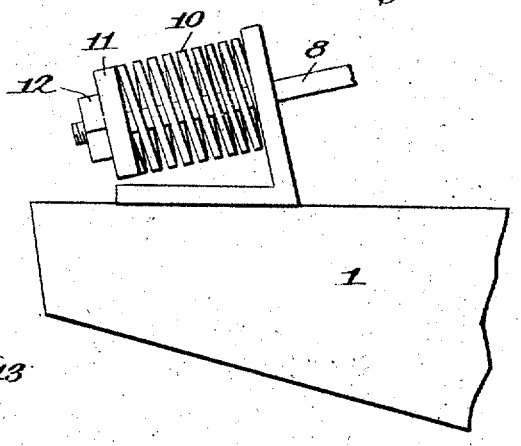

Figure 1 of the drawings, in which the same numerals are applied to the same parts throughout, is a side elevation of the walking beam having my improvement applied to it. Fig. 2 is an end elevation of the rod and bracket together with one of the yokes, which may be of any length, by which the brackets are attached to the beam, and Fig. 3 is a side view of one of the brackets and a part of one of the rods showing the position of the brackets with respect to the beam.

The numeral 1 indicates the beam which carries at the center of its under edge a box 2. The beam is driven by means of the power connection 3 at one end and the drill is raised by the connection 4 at the opposite end. Near each end of the beam is a bracket 6 carrying a truss rod 8 which latter is connected with an intermediate rod 7 passing over the standard 5, by means of the turn buckles 9. Each of the rods 8 is supplied with a heavy spring 10, a washer 11 and a nut 12. The brackets 6 are secured to the beam 1 by means of the yokes 13. A number of these yokes are provided of different sizes in order that the truss rod may be applied to any beam that may happen to be used.

It will be noticed that the yokes 13 pass entirely around the beam thus protecting it from being split by any undue strain. The advantage of this rod is that it allows the beam to bend a certain amount, thus giving the necessary spring to it and yet it is sufficiently stiff, the springs 10 being very heavy, to prevent the beam from breaking under the most severe usage.

When the well is completed the truss rod and its brackets may be removed and the rod taken to another well, leaving the beam on the old well in as good condition as ever for the pumping of the oil.

Another feature of this invention is that it ofter happens that the driller is compelled to return to the well to drill it deeper, and this he can do with the old walking beam by simply putting the truss rod on the old beam, a number of such rods being on hand for any beam. If a new beam is put on the cost is often about $75.00, while with this attachment the cost need be only the time required to put the rods in their place on the old beam, since one set of rods may be used for a number of beams.

A still further advantage of this beam is that, should it happen to be broken by any unusual strain that the danger to the driller is, in a large measure done away with, for he must stand most of his time under the beam, by reason of the fact that the bolts and rods will not allow the beam to drop down on him. It often happens that a beam will be broken, no matter how large, unless provided with a truss, since in many oil fields it is very hot and the timber becomes very brittle.

Having described my invention in such full and clear terms as will enable those skilled in the art to construct and use the same what I claim as new and desire to secure by Letters Patent of the United States is as follows:

1. The combination of a walking beam, a truss rod above and extending substantially from end to end of the beam and having a nut on each end thereof, a shaft box carried by the beam, brackets carried by the beam and secured thereto near each end thereof, and springs interposed between the brackets and the nut carried by each end of the rod, substantially as set forth.

2. The combination of a walking beam, a truss rod therefor extending substantially from end to end of the beam and having a nut on each end thereof, a shaft box carried by the beam, brackets carried by the beam and secured thereto near each end thereof, securing means passing entirely around the end of the beam, and springs interposed between the brackets and the nut on each end of the beam, substantially as described.

3. The combination of a walking beam, a truss rod above and extending substantially from end to end thereof and having a nut on each end, a shaft box carried by the beam, brackets near each end of the beam, yokes carried by the brackets and passing entirely around the beam, and springs interposed between the brackets and the nut on each end of the truss rod, substantially as described.

4. The combination with a walking beam of a truss rod therefor, means to support the rod at a distance above the beam near the center thereof, nuts to tighten the rod on each side of the support, brackets carried by the beam at each end thereof and through which the ends of the rod pass, springs interposed between the brackets and the nut on each end of the truss rod, and a shaft box carried by the beam below the same, substantially as described.

5. The combination of a walking beam, a truss rod therefor, means to support the rod at a distance above the beam near the center thereof, nuts to tighten the rod on each side of the support, brackets carried by the beam at the ends thereof and through which the ends of the truss rod pass, U shaped yokes passing entirely around the ends of the beam and securing the brackets thereto, springs interposed between the brackets and the nut on each end of the truss rod, and a shaft box carried by the beam, substantially as described.

In testimony whereof I have hereunto set my hand this 14 day of November A. D. 1907, in the presence of the two subscribed witnesses.

ELMER W. COKELY.

Witnesses:
W. J. KILBY,
H. R. CROZIER.